Figures 1, 2:
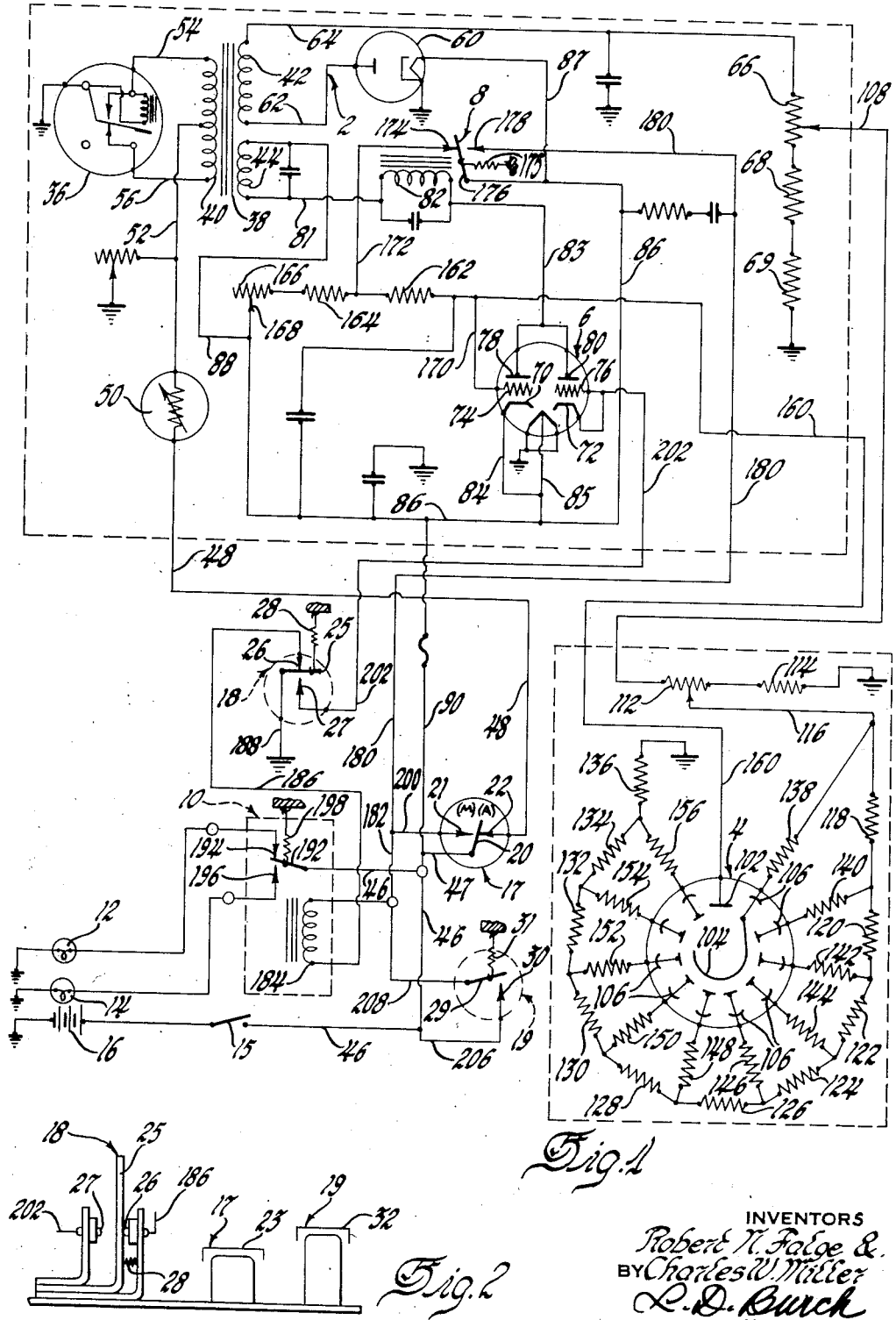

Sept. 10, 1957  R. N. FALGE ET AL  2,806,180
OVERRIDE CONTROL FOR AUTOMATIC HEADLAMP DIMMER
Filed Sept. 14, 1954

INVENTORS
Robert N. Falge &
BY Charles W. Miller
L. D. Burch
ATTORNEY

United States Patent Office 2,806,180
Patented Sept. 10, 1957

2,806,180

OVERRIDE CONTROL FOR AUTOMATIC HEADLAMP DIMMER

Robert N. Falge and Charles W. Miller, Anderson, Ind., assignors to General Motors Corporation, Detroit, Mich., a corporation of Delaware Application September 14, 1954, Serial No. 455,942

10 Claims. (Cl. 315—83)

This invention relates to vehicle illumination systems equipped with conventional or manual and with automatic headlamp dimming control apparatus and, more particularly, to control means in such systems adapted to provide full overriding control over the automatic dimmer apparatus.

To promote safe driving conditions, electronic switching devices have been incorporated in vehicle illuminaton systems for automatically controlling the headlamp beam lighting in response to the illumination from an oncoming vehicle or to roadway illumination. In such systems, it is especially desirable to provide some form of override or over-control means when the vehicle illumination system is conditioned for automatic operation to enable the operator to return momentarily to upper or lower beam lighting under certain emergency and other conditions, as where the automatic dimmer apparatus should "stick" or fail to operate in high or low beam condition, or for purposes of flash signalling, as where it is desired to remind the driver of an oncoming vehicle that he has not dimmed his lights, or to warn the driver of a vehicle being overtaken from behind for safer passing clearance.

Override control means heretofore provided in automatic headlamp dimming systems either have failed to provide full manual control over both the high beam and low beam lighting when the illumination system is under the control of the automatic dimming agency, requiring in some cases disablement of the automatic dimmer apparatus when it is desired to override the high beam lighting condition, or require the overriding control means to be actuated several times in succession for a complete override control cycle. Automatic dimming systems of the latter variety thus present no advantage over conventional foot dimmer controls in the respects discussed and fail to carry out their primary purpose of assuming control over the beam headlighting condition so as to require little or no attention by the operator of the vehicle.

Accordingly, the present invention has among its objects to provide an improved vehicle illumination system including manual and automatic headlamp dimming control apparatus which avoids the above and other deficiencies of prior are apparatus of this character, which provides full overriding control over both the high beam and low beam lighting condition without disabling the automatic dimmer control apparatus and which requires minimum attention by the operator to effect a complete overriding control cycle.

The preferred manner in which the above and other objects, together with the features and advantages attending the present invention will appear more fully from the following detailed description and drawings, wherein:

Fig. 1 is a schematic electrical wiring diagram of an automatic headlamp dimming system apparatus incorporating an overriding control system in accordance with the present invention; and Fig. 2 is a diagrammatic mechanical illustration of a form of override switching arrangement that can be used in the circuit of Fig. 1.

Referring to the drawings, the automatic headlamp dimming apparatus of the vehicle illumination system shown in Fig. 1 is a known form of automatic dimmer control similar to that of copending U. S. patent application S. N. 248,498, filed September 27, 1951, in the names of Charles W. Miller, Harold E. Todd and George W. Onksen, which issued as Patent No. 2,767,347 on October 16, 1956, and comprises, in general, a vibrator power supply 2 which provides both a rectified high voltage output for a photomultiplier type light sensitive pickup device, shown at 4, and a relatively lower voltage alternating current output constituting a source of operating voltage for an amplifier tube 6. Rectified current pulses from the tube 6 flow through a S. P. D. T. sensitive relay 8, which is connected in the output of the tube and controls the condition of energization of a S. P. D. T. power relay 10. Relay 10 is associated with the high beam and low beam filament circuits 12 and 14 of the vehicle illumination system and controls their energization from the vehicle storage battery 16 through dash switch 15. The dimmer apparatus further includes a combination selector and override switch control feature of the present invention which comprises an arrangement of three foot actuated switches which are shown at 17, 18, and 19 of Fig. 1 and are represented diagrammatically in Fig. 2.

Switch 17 is a S. P. D. T. switch having in switching element 20 movable between contacts 21 and 22 and functions to provide a selection of manual (M) or automatic (A) control of the vehicle illumination system. This switch may be a conventional upright dimmer switch of the ratchet action type currently employed in automobile vehicles in which depression or downward movement of the plunger 23 thereof indexes the switch mechanism and changes the vehicle illumination from, say high beam lighting to low beam lighting which condition is permanently maintained after release of the plunger until the latter is again actuated to complete a full cycle of operation.

Switch 18 is a S. P. D. T. switch having a switch arm 25 and a pair of contacts 26 and 27 and functions to provide an overriding high beam to override the low beam lighting circuit for the vehicle headlamps. Switch 18 as illustrated, is adapted to be actuated by sidewise movement of the foot of the operator and is returned to the position shown against contact 26 thereof by suitable means such as spring 28 when the actuator associated with its arm 25 is released.

Switch 19 is a second override switch and furnishes an overriding low beam that overrides the high beam filaments of the vehicle headlamps when the vehicle illumination system is under the control of the automatic dimmer apparatus and, in combination with switch 18, provides an override control arrangement in which full manual control over both high beam and low beam lighting conditions may be had when the illumination system is conditioned for automatic operation. Switch 19 may be an upright switch of the S. P. S. T. variety having a switch arm 29 which is normally held out of engagement with contact 30 thereof by a spring 31 and is provided with a depressible plunger actuator 32 of greater length than the plunger 23 of the selector switch 17 in order that the operator may distinguish readily between these two switches. So that the operator may further distinguish between selector switch 17 and override switch 19, the latter may be provided with a stronger return or stroking spring for the plunger thereof than that associated with the plunger of the selector switch.

The vibrator power supply 2 of the automatic dimmer apparatus shown herein includes a non-synchronous vibrator 36 and an output transformer 38 having a split primary winding 40, a high voltage secondary winding 42 and a low voltage secondary winding 44. The vibrator is connected to the vehicle storage battery only when selector switch 17 is in the position shown, placing the vehicle illumination system under the control of the automatic dimmer apparatus and is contained in a circuit extending from ground to one side of the battery 16 the other side of which is connected over power conductor 46 to conductor 47 continuing through arm 20 and contact 22 of switch 17, conductor 48, ballast device 50 and conductor 52 to the center tap of the transformer primary winding 40, the end terminals of which are connected over conductors 54, 56 to the respective input terminals of the vibrator 36 and then back to ground.

The high potential secondary winding 42 of the transformer 38 is connected in a circuit which extends from ground through a high voltage diode rectifier tube 60, conductor 62, winding 42, conductor 64, adjustable resistance 66 and resistors 68 and 69 to ground. Operating voltage is supplied to the tube 6, shown herein as a double triode vacuum tube having a pair of cathodes 70, 72; grids 74, 76; plates 78, 80, from the alternating current secondary winding 44 of the transformer 38 when the selector switch 17 is in the automatic position shown to complete the energizing circuit to the primary winding 40 of transformer 38.

Secondary winding 44 is connected in a circuit that includes conductor 81 connected to one side of secondary winding 44 and to the energizing coil 82 of the sensitive relay 8, conductor 83 connected to the parallel connected anodes 78, 80 of tube 6, cathode conductor 84, conductors 85, 86 and 88 back to the other side of secondary winding 44. Filament power for the tubes 6 and 60 is supplied over a circuit extending from ground, battery 16, conductor 46, fused branch conductor 99 connected to conductor 86, branch conductors 85 and 87 to one side or the center of the filaments of the respective tubes, the other side of each of which is returned to ground. The left hand section of the double triode vacuum tube 6 is connected as a triode amplifier while the right hand section is connected as a rectifier with grid 76 connected to cathode 72.

The photomultiplier tube 4 includes an anode 102, cathode 104 and a plurality of secondary emissive target or dynode electrodes, designated as 106 and receives the necessary operating voltages therefor from the power supply over a circuit which includes conductor 108 connected to the adjustable arm of resistor 66 and to one side of adjustable resistor 112, the other side of which is connected to series resistor 114 connected to ground. The adjustable arm of resistor 112 is connected over conductor 116 to a voltage dividing resistor chain which includes resistors 118, 120, 122, 124, 126, 128, 130, 132, 134 and 136 to ground. Cathode 104 is connected through resistor 138 to conductor 116 and an arrangement of protective resistors 140, 142, 144, 146, 148, 150, 152, 154, 156 are connected to the individual junctions between adjacent resistors of the voltage divider chain and the respective dynodes 104, as shown. The output of the photomultiplier tube is taken from conductor 160 connected to the plate or anode 102 of the light sensitive pickup device to an amplifier sensitivity level adjusting or hold-in circuit comprising resistors 162, 164 and adjustable resistance 166, the arm 168 of which is connected to conductor 86 the potential of which will be above ground by an amount corresponding to the voltage of battery 16.

The right hand side of resistor 162 is connected by conductor 170 to the grid 74 of the left hand or amplifier section of tube 6, while the left hand side of resistor 162 adjacent resistor 164 is connected over conductor 172 to contact 174 of the sensitive relay 8, the movable switch arm 176 of which is connected back to conductor 86. Contact 178 of the sensitive relay 8 is connected to complete an energizing circuit for the coil of power relay including conductor 180 connected to conductor 182, energizing coil 184 of power relay 10, conductor 186, contact 26 and arm 25 of override switch 18 and conductor 188 to ground.

The relay 10 is a S. P. D. T. power relay and in addition to the energizing coil 184 includes a switch arm 192 movable between a pair of contacts 194, 196 respectively connected with the high beam and low beam filament circuits 12 and 14, and in the de-energized condition of coil 184 thereof is held in the position shown against contact 194 by spring 198 to establish an energizing circuit for the high beam filaments of the vehicle headlamps from the battery 16.

Contact 21 of the selector switch 17 is connected over conductor 200 to conductor 182 and establishes an energizing circuit from the battery for coil 184 of the power relay to attract switch arm 192 thereof into engagement with contact 196, establishing an energizing circuit from the battery for the low beam filament circuit.

Contact 27 of override switch 18 is connected over conductor 202 to the interconnected grid and cathode 76 and 72 of the rectifier section of tube 6 and completes the rectifier circuit of the right hand section of tube 6 when the override switch 18 is actuated.

Override switch 19 has the contact 30 thereof connected by conductor 206 to battery conductor 46 and its switch arm 29 connected over conductor 208 to conductor 182, which is connected to the energizing coil 184 of the power relay 10, and is adapted to provide an energizing circuit for coil 184 to override the high beam headlamp condition when the vehicle illumination system is under the control of the automatic dimming instrumentality.

The operation of the automatic dimming apparatus is as follows: With arm 20 of selector switch 17 in engagement with contact 22, the vehicle illumination system is conditioned for automatic dimming operation. In the absence of illumination on the photomultiplier tube 4, the left hand or amplifier section of tube 6 conducts sufficient current to energize coil 82 of the sensitive relay to attract armature 176 thereof to the position shown into engagement with contact 175 and away from contact 178, thereby disabling the energizing circuit of coil 184 of the power relay 10. The upper or high beam filament headlamp circuit of the vehicle illumination system will then be energized in a circuit from the battery 16, power conductor 46, switch arm 192 and contact 194 of the power relay connected to the high beam filament circuit.

When illumination from an approaching vehicle is encountered and is above a predetermined initial illumination level, sufficient current commences to flow through the photomultiplier tube 4 to develop a control voltage across resistor 162 to decrease the potential on grid 74 and decrease the conductivity of the amplifier tube, thus de-energizing the sensitive relay 8. Switch arm 176 of relay 8 is then retracted by spring 175 thereof into engagement with contact 178 to establish an energizing circuit traced from battery 16 over conductors 46, 90 and 86, arm 176 and contact 178 of relay 8, conductors 180 and 182 to the energizing coil 184 of the power relay 10 and then over conductor 186 through override switch 18 to the grounded side of the battery. Switch arm 192 of power relay is then attracted against the force of spring 198 to the opposite position shown to engage contact 196 thereof and establishes an energizing circuit from the battery for the low beam filament circuit.

De-energization of the sensitive relay 8 also removes the short around sensitivity level adjusting resistors 164 and 166 and places these resistors in series with resistor 162 to increase the sensitivity of the amplifier section by a factor of, say, ten to one. In this manner, a sufficient control signal is developed across the resistors 162, 164 and 166, when the headlamps of the approaching vehicle are dimmed, causing a consequent reduction in the current output from the photo tube to maintain relay 8 de-energized and hold the headlamps on automatic low beam until the vehicles have passed.

In the event that the approaching vehicle has failed to lower or dim the bright headlamps thereof, override switch 18 may be actuated to break the ground circuit of energizing coil 184 of the power relay, thus returning the automatically dimmed headlamps of the controlled vehicle to upper beam condition. At the same time, a ground circuit is momentarily established for the right hand rectifier section of the amplifier tube 6 through conductor 202, contact 27 and arm 25 of override switch 18 and conductor 188 to ground. The rectifier section may then conduct and passes sufficient current through the energizing coil 82 of the sensitive relay 8 to reset the relay into its energized position shown to condition the automatic dimmer for high beam selection operation.

If, at the time the sensitive relay is reset, there is sufficient illumination from the approaching vehicle to actuate the automatic dimmer, the momentarily brightened headlamps of the subject vehicle illumination system will be automatically returned by the automatic dimmer to automatic low beam condition after the foot of the operator releases or is removed from override switch 18. Should the external illumination be removed at the time the sensitive relay is reset, the headlamps will be retained in high beam condition even after the actuator 25 of override switch 18 is released.

When the selector switch 17 is in engagement with contact 21 thereof affording manual or conventional non-automatic control of the vehicle illumination system, the low beam headlamp circuit will be connected to the battery. Momentary overriding action of the manual low beam lighting condition may then be accomplished by actuating the same switch 18 which enables a momentary return to high beam lighting, as long as the switch arm 25 thereof is held against contact 27, the headlamps returning to low beam condition when the actuator of switch 18 is released. Thus, switch 18 provides an overriding high beam which overrides the low beam between both automatic and manual positions of selector switch 17 and completes a full override and return cycle with one single actuation when the vehicle illumination system is conditioned for manual operation or is in condition for automatic dimmer operation when there is sufficient illumination from an approaching vehicle impinging on the photocell 4.

Switch 19 provides a momentary overriding low beam to override the high beam lighting circuit when the selector switch 17 is in the position shown conditioning the vehicle illumination system for automatic dimmer operation. Override switch 19 effectively shunts the control contacts of the automatic dimmer control circuit and provides an energizing circuit for the coil 184 of relay 10 directly from the battery to energize the low beam filament circuit so long as the actuator 29 of this override switch is depressed. When the selector switch 17 is in the opposite position shown, the switch 19 is shorted out of circuit and has no effect on the illumination system should it be accidentally depressed.

When the selector switch 17 is in manual position, the illumination system will be conditioned for low beam headlamp operation, and an overriding high beam for flash signalling a vehicle being overtaken from behind may be effected by actuating override switch 18. Permanent high beam lighting may be had by actuating selector switch 17 to the position shown, in which position the automatic headlamp dimmer will be conditioned for operation and the vehicle headlamps will be retained in high beam condition if no foreign illumination impinges on the photocell 4.

When the selector switch is in manual position, the automatic dimmer circuit is effectively disabled, as power is removed from the vibrator power pack 2, which is an advantage as the major portion of the automatic dimmer load is removed from the battery. However, the filaments of the tubes 6 and 60 are maintained energized over the separate branch circuit, which includes conductor 90 connected to the power line 46, so that automatic control over the vehicle illumination system may be established rapidly whenever desired simply by actuating switch 17 to the position shown to restore power to the vibrator. In this manner undesirable delay required to heat the tube filaments of the automatic dimming apparatus is avoided.

What is claimed is:

1. In a multiple-filament headlamp illumination system energized from a low voltage power source and equipped with both manual and automatic headlamp dimmer control means and with selector means affording a selection between manual and automatic headlamp dimming control, said automatic dimmer control means including electron discharge means having a plate-cathode circuit and a filament circuit and a power supply adapted to supply operating voltage for the said plate-cathode circuit of said electron discharge means, a first circuit connecting said power supply for energization from said power source through said selector means and a second circuit connecting said filament circuit of said electron discharge means for direct energization from said power source.

2. In a multiple-filament headlamp illumination system energized from a low voltage power source and equipped with both manual and automatic headlamp dimmer control means and with selector means affording a selection between manual and automatic headlamp dimming control, said automatic dimmer control means including a light sensitive pickup device, a thermionic tube having a plate-cathode circuit and a filament circuit and a power supply adapted to supply operating voltages for said light sensitive pickup device and said plate-cathode circuit of said thermionic tube; the combination of a first circuit connecting said power supply for energization from said power source through said selector means and a second circuit connecting said tube filament circuit for direct energization from said power source.

3. In a multiple-beam headlamp illumination system including a source of power, upper beam and lower beam headlamp circuits, beam switching means selectively connecting said headlamp circuits for energization from said source of power, automatic headlamp dimmer control means connected in circuit controlling relation with said beam switching means and including a thermionic control tube having a plate-cathode circuit and a filament circuit and a power supply adapted to supply operating voltage for the plate-cathode circuit of said tube, and selector switching means operable between a pair of circuit completing contact positions affording a selection of conventional and automatic control of said headlamp illumination system; the combination of circuit means connecting said power supply for energization from said power source through one of the said circuit completing contact positions of said selector switching means and a separate branch circuit directly connecting said tube filament circuit for energization from said power source in either position of said selector switching means.

4. In a multiple beam headlamp illumination system including a source of power, upper beam and lower beam headlamp circuits, beam switching means including an operating coil and a movable switching element connected to said power source and operable between a low beam circuit completing position when said operating coil is energized and a high beam circuit completing position when said coil is de-energized, automatic switching means operable in response to a predetermined external control stimulus to complete an energizing circuit from said power source to said operating coil of said beam switching means, a normally open spring return override switch connected to said power source and said operating coil providing a momentary override of said high beam headlamp circuit and returning said beam switching means to its high beam circuit completing position upon release thereof.

5. In a multiple beam headlamp illumination system including a source of power, upper beam and lower beam headlamp circuits, beam switching means including an operating coil for a movable switching element connected to said power source and operable between a pair of circuit completing contact positions connected to respective ones of said upper beam and lower beam headlamp circuits, two position selector switching means including a movable switching element connected to said power source and said operating coil in one of the selector positions thereof, automatic headlamp dimmer control means connected for energization from said power source in the other position of said selector switching means and operable in response to a predetermined external control stimulus to complete a circuit from said power source to said operating coil, a normally open spring return override switch operable independently of said selector switching means to complete an energizing circuit from said power source to said operating coil when said selector switching means is in position to energize said automatic dimmer control means and providing a momentary override of said high beam headlamp circuit and returning said beam switching means to its high beam circuit completing position upon release thereof.

6. In a multiple beam headlamp illumination system including a source of power, upper beam and lower beam headlamp circuits, beam switching means including an operating coil for a movable switching element connected to said power source and operable between a pair of circuit completing contact positions connected to respective ones of said upper beam and lower beam headlamp circuits, two position selector switching means including a movable switching element connected to said power source and said operating coil in one of the selector positions thereof, automatic headlamp dimmer control means connected for energization from said power source in the other position of said selector switching means and operable in response to a predetermined external control stimulus to complete a circuit from said power source to said operating coil, a normally open spring return override switch operable independently of said selector switching means and adapted to complete an energizing circuit from said power source to said operating coil when said selector switching means is in position to energize said automatic dimmer control means, said override switch providing a momentary override of said high beam headlamp circuit and returning said beam switching means to its high beam circuit completing position upon release thereof, said selector switching means shunting said override switch out of circuit controlling relation when connected in one of the selector positions thereof.

7. In a multiple beam headlamp illumination system including a source of power, upper beam and lower beam headlamp circuits, beam switching means including an operating coil for a movable switching element connected to said power source and operable between a pair of circuit completing contact positions connected to respective ones of said upper beam and lower beam headlamp circuits, two position selector switching means including a movable switch arm connected to said power source and to said operating coil to complete said low beam headlamp circuit in one of the positions of said selector means, automatic headlamp dimmer control means connected for energization from said power source in the other position of said selector switching means and operable in response to a predetermined external control stimulus to complete an energizing circuit from said power source to said operating coil, low beam override control switching means connected in circuit interrupting relation with said operating coil and operable independently of said selector switching means to interrupt energization of said operating coil in either position of said selector switching means when said lower beam headlamp circuit is energized from said power source.

8. In a multiple beam headlamp illumination system including a source of power, upper beam and lower beam headlamp circuits, beam switching means including an operating coil for a movable switching element connected to said power source and operable between a pair of circuit completing contact positions connected to respective ones of said upper beam and lower beam headlamp circuits, two position selector switching means including a movable switch arm connected to said power source and to said operating coil to complete said low beam headlamp circuit in one of the positions of said selector means, automatic headlamp dimmer control means connected for energization from said power source in the other position of said selector switching means and operable in response to a predetermined external control stimulus to complete an energizing circuit from said power source to said operating coil, low beam override control switching means connected in circuit interrupting relation with said operating coil and operable independently of said selector switching means to interrupt energization of said operating coil in either position of said selector switching means when said lower beam headlamp circuit is energized from said power source, and upper beam override switching means connected to said power source and said operating coil.

9. In a multiple beam headlamp illumination system including a source of power, upper beam and lower beam headlamp circuits, beam switching means including an operating coil for a movable switching element connected to said power source and operable between a pair of circuit completing contact positions connected to respective ones of said upper beam and lower beam headlamp circuits, two position selector switching means including a movable switch arm connected to said power source and to said operating coil to complete said low beam headlamp circuit in one of the positions of said selector means, automatic headlamp dimmer control means connected for energization from said power source in the other position of said selector switching means and operable in response to a predetermined external control stimulus to complete an energizing circuit from said power source to said operating coil, low beam override control switching means connected in circuit interrupting relation with said operating coil and operable independently of said selector switching means to interrupt energization of said operating coil in either position of said selector switching means when said lower beam headlamp circuit is energized from said power source, and upper beam override switching means connected to said power source and said operating coil, said upper beam override switching means being separate from and operable independently of said selector switching means and said low beam override switching means to shunt said automatic dimmer control means when said selector switching means is in its automatic dimmer control energizing position.

10. In a multiple beam headlamp illumination system energized from a power source and equipped with both manual and automatic headlamp dimmer control means, beam switching means including an operating coil for a movable switching element connected to said power source and operable between a lower beam circuit completing position when said operating coil is energized and an upper beam circuit completing position in the de-energized coil position, selector means affording a selection between manual and automatic headlamp dimming control, upper beam override control switching means connected in circuit completing relation from said power source to said operating coil, and lower beam override control switching means connected in circuit interrupting relation between said power source and said operating coil, said override control switching means being independently operable of each other and of said selector means.

References Cited in the file of this patent

UNITED STATES PATENTS 2,687,277    Bordewieck et al. _____ Aug. 10, 1954